March 21, 1961     A. E. BISHOP     2,975,652
DOUBLE ROLLER HOURGLASS STEERING GEAR
Filed July 6, 1959     3 Sheets-Sheet 1
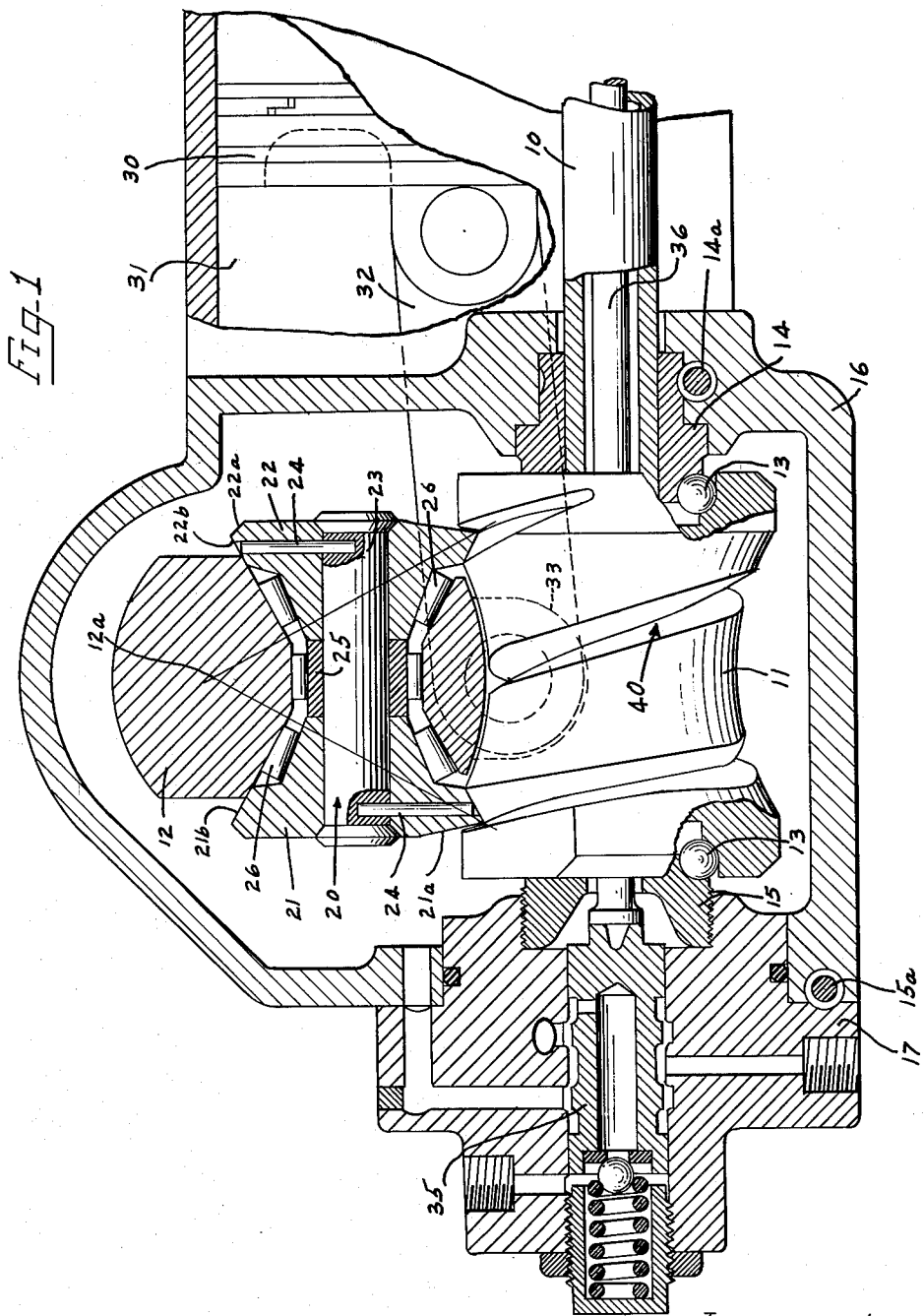
Inventor
Arthur E. Bishop March 21, 1961 — A. E. BISHOP — 2,975,652
DOUBLE ROLLER HOURGLASS STEERING GEAR
Filed July 6, 1959
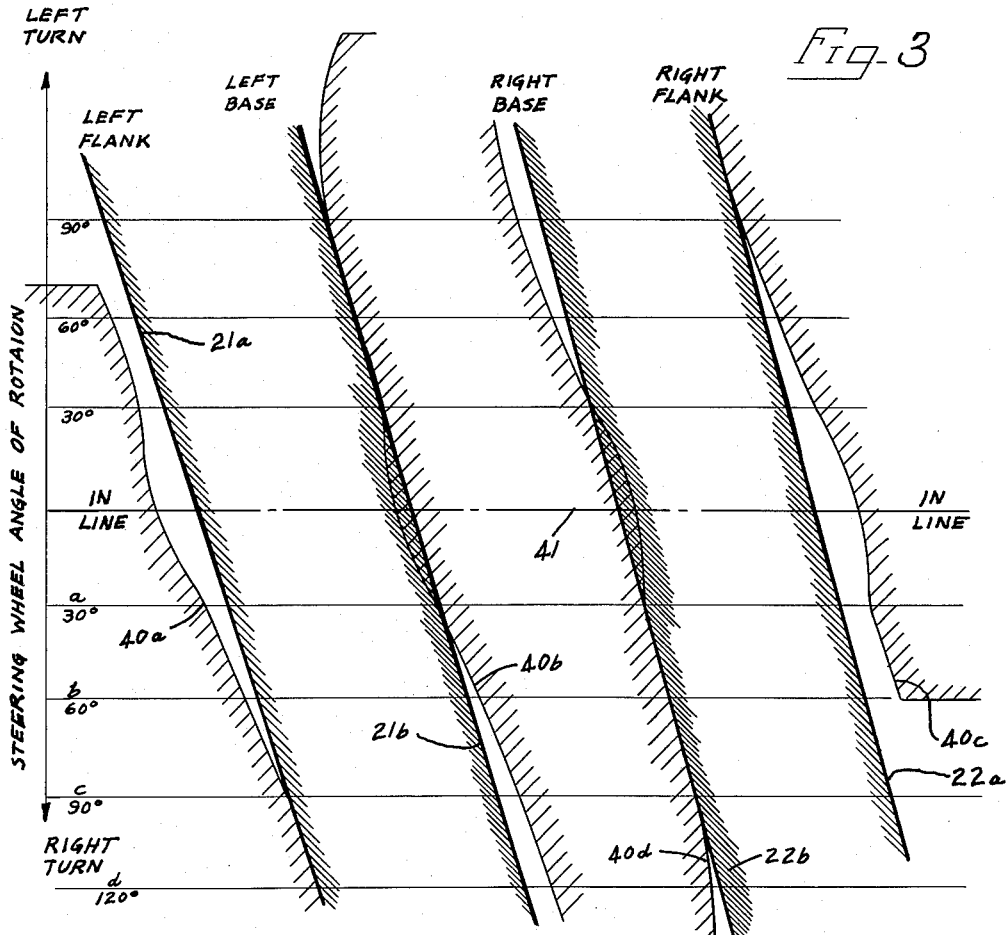
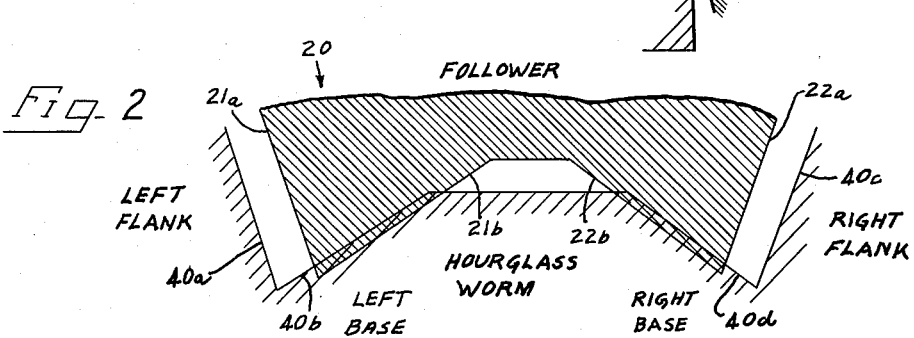
Inventor
Arthur E. Bishop March 21, 1961  A. E. BISHOP  2,975,652
DOUBLE ROLLER HOURGLASS STEERING GEAR
Filed July 6, 1959  3 Sheets-Sheet 3

Inventor
Arthur E. Bishop

United States Patent Office 2,975,652
Patented Mar. 21, 1961

2,975,652
DOUBLE ROLLER HOURGLASS STEERING GEAR
Arthur E. Bishop, 12 Millwood Ave., Chatswood, near Sydney, New South Wales, Australia
Filed July 6, 1959, Ser. No. 824,985
9 Claims. (Cl. 74—500)

The present invention relates to steering systems for vehicles employing at least one dirigible wheel. More particularly, the invention is concerned with the provision of a novel and substantially improved steering gear of an extremely compact nature capable of handling heavy duty steering loads substantially without steering wheel slack or play in the straight-ahead or neutral steering condition. The apparatus of the present invention is also particularly suited to power steering applications incorporating variable ratio gear reduction between the steering shaft and the steering output to the dirigible wheel.

The present invention relates to the double roller hourglass worm construction of the general type shown in my preceding Patent No. 2,865,218 dated December 23, 1958. As was pointed out in my said earlier patent, such a double roller hourglass steering gear provides for contact of both rollers with the hourglass worm when the steering gear is in its neutral, straight-ahead condition. The present invention is concerned with the provision of preload between the follower rollers and the hourglass worm track when the parts are in their neutral condition and a controlled transfer of the steering load from inner and outer surfaces of the individual follower roller during steering movement. In accordance with the present invention, each of the follower rollers is provided with a pair of annular follower surfaces of generally frustro-conical configuration, one surface having a bevel converging to a point generally between the follower rollers and the other surface having a bevel generally converging toward a point axially beyond the outer end of the individual roller follower. By providing a generally V-shaped groove in the hourglass worm, it will be apparent that the above arrangement provides four possible sets of co-operating surfaces for the transfer of steering loads. In accordance with the principles of the present invention, a pair of counteracting separate surfaces are provided in preloaded contact when the steering gear is in its straight-ahead, neutral, condition. As the steering gear moves away from the neutral condition in one direction of rotation of the steering shaft, the load is transferred from the two sets of surfaces previously engaged to a third set and, in the opposite direction of rotation the load is transferred to the fourth sets of surfaces. By controlling the changeover points of surface contact and appropriately mating the contacting surfaces of the four sets of surfaces, varying steering ratios may be provided readily, and extremely accurate control of the backlash of the steering system may be accomplished.

It is, accordingly, an object of the present invention to provide an improved compact steering system providing a plurality of separate load-transferring surfaces in combination in a double follower hourglass worm gear reduction mechanism.

Another object of the present invention is to provide superior load characteristics in a steering system for automotive vehicles.

Still a further object of the present invention is to provide an improved variable ratio steering apparatus susceptible to accurate ratio control.

Still a further object of the present invention is to provide a variable ratio steering gear unit for automotive vehicles in which an in-line preload is provided for preventing any slack in the steering wheel in the in-line condition and in which slack is also prevented from occurring during changes in ratio occurring immediately upon initiation of a vehicle turn.

Still other and further objects and features of the present invention will become apparent to those skilled in the art from a consideration of the attached drawings wherein one embodiment of the invention is shown by way of illustration only, and wherein:

Figure 1 illustrates a double roller follower, hourglass variable ratio steering gear assembly incorporating the principles of the present invention;

Figure 2 is a diagrammatic illustration of the fit relationship between the hourglass worm and the follower, in partial cross-section;

Figure 3 is an expanded projection of the hourglass worm grooves and the rollers contacting therewith showing the relative positions of the worm grooves and rollers in various degrees of steering wheel rotation;

As shown on the drawings:

Figure 4:
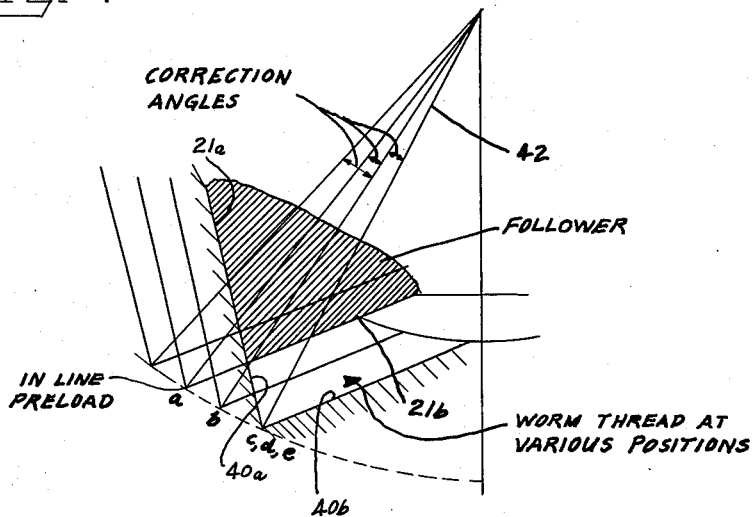
Figure 4 is a schematic illustration of the cam follower and the clearances provided in various positions of its rotation, relative to the hourglass worm grove.

As may be seen from a consideration of Figure 1, the device of the present invention comprises a steering gear for conventional automotive vehicles or the like having a steering wheel input shaft 10, an hourglass worm 11, and a steering output or cross shaft 12 connected by any conventional means to dirigible vehicle wheels. As shown, the hourglass worm 11 is mounted on ball bearings 13 carried by race members 14 and 15 mounted in the gear housing 16 and the sub-housing 17, respectively. The hourglass worm 11 is splined to the steering shaft 10 to rotate therewith in the usual manner.

Rotation of the steering shaft 10, with consequent rotation of the hourglass worm 11 causes rotation of the output or cross shaft 12 about its axis 12a through contact of the double roller follower member generally indicated at 20. The double roller follower comprises, as shown, a pair of roller members 21, 22 rigidly secured to center pin 23 by pins 24, or other equivalent fastening means to provide a unitary pair of roller members. The rollers are accurately spaced by a spacer element 25 and the unit is rotatably supported in the cross shaft by means of roller bearings 26.

As pointed out above, the present device is preferably constructed for inclusion in a power steering system. Accordingly, a hydraulic piston 30 is provided in cylinder 31 and is connected via a link 32 and crank arm 33 to the cross shaft 12. The movement of the piston 30 is controlled by a reciprocable spool valve 35 moved axially by a reciprocal rod 36 actuated in response to the application of steering torque to the steering wheel of the vehicle. The specific construction and operation of the valve 35 and the piston 30 are conventional and do not form a part of the present invention. For further discussion of one form of valve and piston control, see my prior patent No. 2,865,218 dated December 23, 1958.

In accordance with the principles of the present invention, a novel and substantially improved double roller and hourglass worm relationship is provided. This relationship comprises a novel distribution of the load contacts between the hourglass worm thread or groove and the rollers moving therein. In the present invention, the individual rollers are machined to provide four possible surfaces of contact. Likewise, the worm thread in the hourglass worm is ground to provide contact with the respective roller on both sides of the groove, depending upon the position of the output shaft 12 during steering operation.

This novel load-transferring structure may be clearly understood from Figures 2, 3, 4 and 5 wherein the relationships are diagrammatically set forth. Since the two rollers of the follower are assembled to rotate in a fixed relationship, axially, relative to one another, they are diagrammatically illustrated as a single unit in Figure 2 at 20. As shown in Figure 2, the individual rollers are provided with annular generally conically beveled surfaces the outermost of which may be termed the flanks or outboard surfaces of the follower roller and the axially innermost may be termed the bases, or inboard surfaces. Thus, as viewed in Figure 2, the lefthand surface 21a comprises the left flank surface and the adjacent base surface 21b may be termed the left base surface. Similarly, on the right follower, the outermost surface may be termed the right flank, 22a, and the adjacent inwardly facing beveled surface 22b may be termed the right base. These surfaces are illustrated in a two-dimensional fashion at the respective positions 21a, 21b, 22a and 22b in Figure 2. The hourglass worm 11 is similarly provided with the groove 40 having portions which may, for purposes of simplicity and description, be termed as left flank, left base, right flank, and right base, as indicated in Figure 2. These surfaces are shown with numerals 40a, 40b, 40c, and 40d, respectively.

As shown in Figure 2, diagrammatically, the follower and hourglass worm are positioned relative to one another in the manner intended in the center, in-line steering condition. As will be seen, the left base and right base of the follower overlap slightly the left base and right base of the worm. This illustrates an interference or preload condition. It is desired in the manufacture of steering gear that no slack be apparent in the system in the straight-ahead or inline steering condition. By providing the opposed interference fit above mentioned, all slack is eliminated since the bearing supporting the follower, and the bearing supporting the worm are loaded as the parts reach the central condition. It is preferred that the amount of interference approximates .002 inch but it will be understood that this figure may be varied somewhat in different installations. With the parts in this position the load is equally shared by the two rollers 21 and 22, thus providing an extremely strong gear with the parts in their neutral condition, in which most driving is done.

The balance of movement between the follower and the worm may be traced from a consideration of Figure 3. As there shown diagrammatically in development form, the surfaces of the follower rollers and the worm are shown at 21a, 21b, 22a, 22b and 40a, 40b, 40c and 40d. The in-line or straight-ahead condition is illustrated by the center line 41. It will be noted that the lines 21a and 21b are straight lines parallel to each other, as are lines 22a and 22b. These lines are inclined at an acute angle relative to the center line 41 to indicate the fact that they co-operate with a helical worm thread and assume an angle relative to the axis of the worm to permit rotation about an axis approximately perpendicular to the groove of the worm at the point of roller contact therewith. The groove surfaces 40a and 40b are likewise parallel to each other as are the groove surfaces 40c and 40d. The groove surfaces 40a and 40b are parallel since they comprise flank and base surfaces of the same groove manufactured simultaneously by the same cutter element moving relative to the hourglass worm. Similarly, the hourglass worm groove surfaces 40c and 40d are parallel. These surfaces may be cut in accordance with the method and apparatus of my presently copending application entitled "Method and Apparatus for Making Variable Lead Hourglass Steering Gear Worms," U.S. Serial No. 741,894, filed on June 13, 1958. The master cam may, of course, be modified to provide the slightly curved form of the groove shown in Figure 3.

As may be seen, the hourglass worm groove is slightly humped in the in-line condition to provide the interference fit for approximately 30° of worm rotation on either side of the neutral condition. As the hourglass worm is rotated in the right-hand direction, the curves 40c and 40d would move toward the centerline position for contact with the roller. This is shown in developed form by the area of the curve surface 40d below the in-line center line 41 in Figure 3. Thus, as the hourglass worm is rotated to the right, in a right turn, the right base 22b moves from an interference fit with the right base 40d of the worm to a position of non-interference contact after 30° of movement of the hourglass worm. As the hourglass worm continues to move, contact is maintained between the surfaces 22b and 40d until the worm has turned approximately 90°. It will be seen, that as the worm rotates, the clearance provided between the left flank of the roller 21a and the left flank of the worm, grooves 40a has decreased until after rotation of the worm approximately 90° contact is provided between the left flank 21a and the left flank 40a so that continued rotation of the worm provides contact, and hence load transfer, between the left flank surfaces while the right roller completely disengages from the groove of the hourglass worm. Thus, for larger angles of turn, the load is taken on the left flank surfaces, the steering load having a tendency to return the parts to the neutral condition at all times.

Similarly, when the worm is rotated in a left-hand direction to make a left turn, the interference fit between the left and right base surfaces of the worm follower, and the left and right base surfaces of the worm grooves diminishes until the worm is turned approxmately 30°. Beyond this point, from the position of 30° to the position of 90° the contact is between the left base of the follower and the left base of the hourglass worm groove, and beyond 90° the load contact is between the right flank surfaces of the follower and the groove.

By the technique of transferring the load by four surfaces rather than merely two as in previously known systems, slack is substantially eliminated from the steering gear and at the same time very accurate control of the rotio of the worm and follower connection is provided.

In the diagrammatic illustration discussed immediately above, it may be assumed that the ratio is a constant ratio. However, variable ratio is simply achieved in the present system by cutting the successively contacting portions of the hourglass groove with a variable helical curve. This need only be done on the individual surface contacting the roller at any given instant in the turn and will not cause interference or binding in the worm gear in view of the substantial clearance provided between the other, non-contacting surfaces. Thus, at any given input position of the worm, the groove or thread is designed so that only one of the four possible groove faces is in contact with the follower, and this face controls the ratio curve at that point. It will, of course, be understood that the clearances shown in Figures 1 and 2 are greatly magnified, or exagerated, to provide visual illustration. In actual practice, the clearance at its maximum would approximate only about .020 inch, which is more than ample to prevent interference or binding.

The thread or groove on the left side of the hourglass worm is shown relative to the left follower, at various positions of input, in Figure 4. In that figure, the several positions corresponding to the positions designated a, b, c, d, and e in Figure 3, are indicated by the same designation as in Figure 3. Thus, in the position of the worm indicated at c, d, e, the left flank 21a of the follower is in contact with the left flank surface 40a of the worm groove while a substantial clearance space exists between the left base 21b and the left base of the worm at 40b. In the position of the parts at b, on the other hand, the left follower is at an approximate midpoint between the left flank and left base portions 40a and 40b respectively of the worm. On the other hand, in the *a* position, the left base 21*d* is in contact with the left base 40*d* of the follower groove while the left flank 21*a* is substantially removed from the left flank 40*a* corresponding to that position. When the parts are in the in-line or preloaded condition, it will be seen that the left base 40*b* of the cam groove actually interferes with the left base 21*b* of the follower, providing approximately .002 inch interference at this position, with a maximum clearance between the left flank surface 40*a* of the worm groove and the left flank 21*a* of the follower. In this connection, it is noted that an optimum design for the follower according to the present invention comprises a follower roller in which the bisector of the left flank and left base surfaces intersects the axis of rotation of the output shaft. In one very satisfactory construction, the total included angle between the left flank and left base comprises approximately 75° and the angle A between the bisector 42 of the left base and left flank and the bisector between the right base and right flank approximates 55°. These figures may, however, be modified without departing from the invention. The bisector is indicated by the center line 42.

Figure 5:
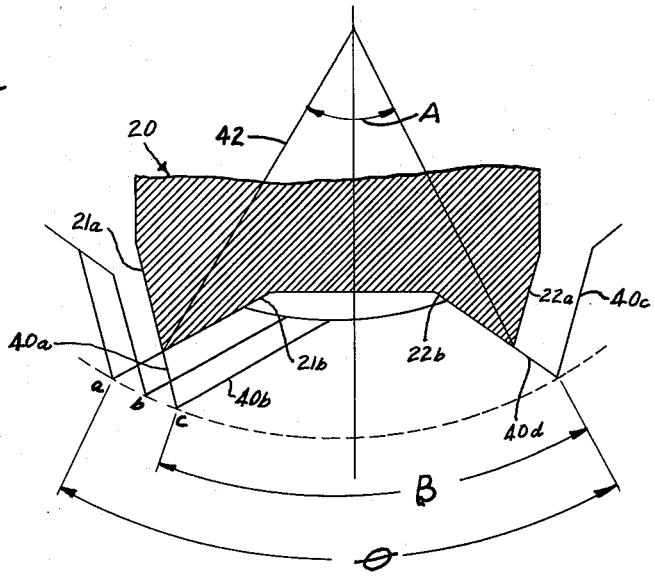
Figure 5 is a further diagrammatic illustration of the relationship between the roller and the hourglass worm, showing the clearances existing therebetween.

In Figure 5, the complete double roller follower is illustrated with the base of the right thread or groove in contact as it is from positions *a* to *c* during a right turn. In this range, the figure shows the position of the left portion of the worm follower groove as it varies from positions *a* through *c*, illustrating the manner in which the clearance shifts between the left base and the left flank surfaces. Thus it can be seen that in this region of worm and follower positioning, in which both followers are within the confines of the hourglass worm, or, in other words, are enmeshed with the worm, the angle between the two portions of the thread, as viewed along the axis of the shaft 12, is made to vary from $\theta$ to B. Any error in this angle, in either the worm thread or the follower will not result in any interference or binding but rather only in a slight error in the contact changeover point with respect to the angle of rotation of the worm. If the angular tolerance is somewhat smaller than intended, the flank of the left follower, 21*a*, will contact the left flank 40*a* slightly earlier than planned and develop clearance at the right base slightly before point *c* is reached. If, on the other hand, the angular tolerance is somewhat higher than expected or desired, the reverse is true and the contact changeover will occur slightly after point *c* is reached. The limiting factor controlling the maximum tolerance permitted is governed by the point *e* at which one follower completely disengages from the hourglass worm groove and at which point contact between the flank surfaces should have occurred in order to provide smooth transition.

It will be observed that the variation in clearance above illustrated and described may readily be accomplished by adding or subtracting a correction angle to the output angular position of the follower (about its axis of rotation 12*a*) at each successive input angular position, as shown in Figure 4. In the generation of the hourglass worm groove, accordingly, the groove is machined by adding or subtracting the correction angle to the position of the groove cutter relative to the angular rotation of the worm, which positioning is achieved by configuration of the master cam fully described in the above-mentioned copending application Serial No. 741,894.

In the form of the invention shown, a single hourglass cam groove 40 is illustrated. However, as in my Patent No. 2,865,218, Figure 5, two overlapping grooves may be used if desired without changing the basic operation of the device.

Adjustment of the worm relative to the followers may be accomplished in various ways. The output shaft 12 may, for example, be transversely shifted toward the worm. In Figure 1, the worm is mounted on eccentric races 14 and 15 which may in turn be rotated in the housing 10 by an adjusting worm 14*a* and 15*a*.

It will thus be seen that I have provided a novel steering gear apparatus in which a pair of hourglass worm followers are provided and in which the load is transferred back and forth between the worm and the follower between four distinct pairs of surfaces. In the center or in-line condition the load is simultaneously carried by two pairs of surfaces providing an extremely rugged slack-free steering gear drive connection. As the steering gear is rotated, in turning the vehicle, the load is assumed by successive different pairs of surfaces first on one roller, and then on the other roller as the first mentioned roller moves completely out of contact with the worm. An extremely compact steering gear is, accordingly, provided and, further, a gear is provided in which variable ratio may be imposed on the worm groove by merely varying the helical pitch of the successively engaged worm groove surfaces. It will be apparent to those skilled in the art that the specific form of the invention illustrated is desirable, but that other forms are within the scope of the present invention. Accordingly, it is my intention that the scope of this invention be limited only by the scope of the hereinafter appended claims.

I claim as my invention:

1. A steering gear comprising an hourglass worm having generally helically grooved portions for drivingly contacting a follower, comprising a pair of rollers mounted on an output shaft for rotation about the axis of rotation of said output shaft transverse to said worm and about an axis generally transverse to the axis of said output shaft, said rollers both engaging the grooved portions of said worm in the central in-line position and alternately independently engaging said worm as the worm rotates away from the in-line condition, each said roller having axially spaced annular beveled roller surfaces thereon comprising flank surfaces and base surfaces and said groove portions having beveled sides for contact therewith, the base surfaces of said rollers contacting said worm groove portions in in-line condition, the base surface of one roller alone engaging a groove portion as the worm rotates away from in-line condition, and the flank surface of the other roller engaging the worm as the worm continues to rotate against a steering load and the one roller moves out of engagement with the worm.

2. A steering gear comprising an hourglass worm having generally helically grooved portions for drivingly contacting a follower, comprising a pair of rollers mounted on an output shaft for rotation about the axis of rotation of said output shaft transverse to said worm and about an axis generally transverse to the axis of said output shaft, said rollers both engaging the grooved portions of said worm in the central in-line position and alternately independently engaging said worm as the worm rotates away from the in-line condition, each said roller having axially spaced annular beveled roller surfaces thereon comprising flank surfaces and base surfaces the bisector of which passes approximately through the center of rotation of the output shaft, and said groove portions having beveled sides for contact therewith, the base surfaces of said rollers contacting said worm groove portions in in-line condition, the base surface of one roller alone engaging a groove portion as the worm rotates away from in-line condition, and the flank surface of the other roller engaging the worm as the worm continues to rotate against a steering load and the one roller moves out of engagement with the worm.

3. A steering gear comprising an hourglass worm having generally helically grooved portions for drivingly contacting a follower, comprising a pair of rollers mounted on an output shaft for rotation about the axis of rotation of said output shaft transverse to said worm and about an axis generally transverse to the axis of said output shaft, said rollers both engaging the grooved portions of said worm in the central in-line position and alternately independently engaging said worm as the worm rotates away from the in-line condition, each said roller having axially spaced annular beveled roller surfaces thereon comprising flank surfaces and base surfaces the bisector of which passes approximately through the center of rotation of the output shaft, and said groove portions having beveled sides for contact therewith, the base surfaces of said rollers contacting said worm groove portions in the in-line condition with an interference preload fit, the base surface of one roller alone engaging a groove portion as the worm rotates away from in-line condition, and the flank surface of the other roller engaging the worm as the worm continues to rotate against a steering load and the one roller moves out of engagement with the worm.

4. A steering gear comprising an hourglass worm having generally helically grooved portions for drivingly contacting a follower, comprising a pair of rollers mounted on an output shaft for rotation about the axis of rotation of said output shaft transverse to said worm and about an axis generally transverse to the axis of said output shaft, said rollers both engaging the grooved portions of said worm in the central in-line position and alternately independently engaging said worm as the worm rotates away from the in-line condition, each said roller having axially spaced annular beveled roller surfaces thereon comprising flank surfaces and base surfaces, and said groove portions having beveled sides for contact therewith, the base surfaces of said rollers contacting said worm groove portions in the in-line condition with an interference preload fit, the base surface of one roller alone engaging a groove portion as the worm rotates away from in-line condition, and the flank surface of the other roller engaging the worm as the worm continues to rotate against a steering load and the one roller moves out of engagement with the worm.

5. In combination in a steering gear, a steering input shaft and an output shaft, gear reduction means between said shafts, said gear reduction means comprising an hourglass worm having a roller-engaging cam track therein, said cam track having a helical pitch, said output shaft being rotatably mounted transversely of said worm, a pair of spaced rollers mounted on said output shaft for rotation about an axis transverse to the axis of said output shaft, said rollers being in simultaneous engagement with said cam track at points adjacent the opposite ends thereof when said output shaft is in its centered neutral position but in alternate independent positive engagement with said cam track as the output shaft moves away from centered position, each of said rollers having a pair of annular beveled roller surfaces whereby said spaced rollers provide inboard and outboard bearing surfaces, said rollers contacting said cam track with their inboard surfaces when in centered neutral position, one of said rollers contacting said cam track by its inboard surface as said hourglass worm rotates from its centered neutral position to a second position, and the other of said rollers contacting said cam track by its outboard surface upon continued movement of said hourglass worm beyond said second position.

6. In combination in a steering gear, a steering input shaft and an output shaft, gear reduction means between said shafts, said gear reduction means comprising an hourglass worm having a roller-engaging cam track therein, said cam track having a helical pitch, said output shaft being rotatably mounted transversely of said worm, a pair of spaced rollers mounted on said output shaft for rotation about an axis transverse to the axis of said output shaft, said rollers being in simultaneous engagement with said cam track at points adjacent the opposite ends thereof when said output shaft is in its centered neutral position but in alternate independent positive engagement with said cam track as the output shaft moves away from centered position, said engagement between said rollers and said cam track in the centered neutral position comprising an interference preload engagement.

7. A steering gear comprising an hourglass worm having generally helically grooved portions for drivingly contacting a follower, comprising a pair of rollers mounted on an output shaft for rotation about the axis of rotation of said output shaft transverse to said worm and about an axis generally transverse to the axis of said output shaft, said rollers both engaging the grooved portions of said worm in the central in-line position and alternately independently engaging said worm as the worm rotates away from the in-line condition, each said roller having axially spaced annular beveled roller surfaces thereon comprising flank surfaces and base surfaces and said groove portions having beveled sides for contact therewith, the base surfaces of said rollers contacting said worm groove portions in in-line condition, the base surface of one roller alone engaging a groove portion as the worm rotates away from in-line condition, and the flank surface of the other roller engaging the worm as the worm continues to rotate against a steering load and the one roller moves out of engagement with the worm, whereby the transfer of torque from said worm to said follower is sequentially accomplished by a series of contacting surfaces, and wherein said sequential surfaces are inclined relative to the axis of said worm varying amounts to provide a variable ratio force transmission between said worm and said output shaft.

8. A steering gear comprising an hourglass worm having generally helically grooved portions for drivingly contacting a follower, comprising a pair of rollers mounted on an output shaft for rotation together about the axis of rotation of said output shaft transverse to said worm and about an axis generally transverse to the axis of said output shaft, said rollers both engaging the grooved portions of said worm in the central in-line position and alternately independently engaging said worm as the worm rotates away from the in-line condition, each said roller having axially spaced annular beveled roller surfaces thereon comprising flank surfaces and base surfaces and said groove portions having beveled sides for contact therewith, the base surfaces of said rollers contacting said worm groove portions in in-line condition, the base surface of one roller alone engaging a groove portion as the worm rotates away from in-line condition, and the flank surface of the other roller engaging the worm as the worm continues to rotate against a steering load and the one roller moves out of engagement with the worm.

9. A steering gear comprising an hourglass worm having generally helically grooved portions for drivingly contacting a follower, comprising a pair of rollers mounted on an output shaft for rotation about the axis of rotation of said output shaft transverse to said worm and about an axis generally transverse to the axis of said output shaft, said rollers both engaging the grooved portions of said worm in the central in-line position and alternately independently engaging said worm as the worm rotates away from the in-line condition, each said roller having axially spaced annular beveled roller surfaces thereon comprising flank surfaces and base surfaces and said grooved portions having beveled sides for contact therewith and having a greater width than its respective roller to provide clearance relative to at least one surface thereof, the base surfaces of said rollers contacting said worm groove portions in in-line condition, the base surface of one roller alone engaging a groove portion as the worm rotates away from in-line condition, and the flank surface of the other roller engaging a grooved portion of the worm as the worm continues to rotate against a steering load and the one roller moves out of engagement with the worm.

References Cited in the file of this patent

UNITED STATES PATENTS

| | | |
|---|---|---|
| 2,762,231 | MacDuff | Sept. 11, 1956 |
| 2,779,206 | Doerfner | July 29, 1957 |
| 2,865,218 | Bishop | Dec. 23, 1958 |